(12) United States Patent
Weber

(10) Patent No.: US 7,963,700 B2
(45) Date of Patent: Jun. 21, 2011

(54) SEALING DEVICE FOR ANTIFRICTION BEARING COMPRISING IDENTIFYING MEANS

(75) Inventor: Marc-Alain Weber, Annecy (FR)

(73) Assignee: S.N.R. Roulements, Annecy (FR)

( * ) Notice: Subject to any disclaimer, the term of this patent is extended or adjusted under 35 U.S.C. 154(b) by 548 days.

(21) Appl. No.: 11/920,452

(22) PCT Filed: May 29, 2006

(86) PCT No.: PCT/FR2006/001209
§ 371 (c)(1),
(2), (4) Date: Feb. 25, 2008

(87) PCT Pub. No.: WO2006/129000
PCT Pub. Date: Dec. 7, 2006

(65) Prior Publication Data
US 2009/0046966 A1    Feb. 19, 2009

(30) Foreign Application Priority Data

May 31, 2005  (FR) ...................................... 05 05506

(51) Int. Cl.
*F16C 33/72*   (2006.01)
*F16C 33/76*   (2006.01)
*G01P 3/42*    (2006.01)

(52) U.S. Cl. ......... 384/477; 384/448; 324/160; 324/173

(58) Field of Classification Search .................. 384/450, 384/477, 446, 448, 491; 340/682; 324/173–174, 324/207.25, 160
See application file for complete search history.

(56) References Cited

U.S. PATENT DOCUMENTS

| | | | | |
|---|---|---|---|---|
| 5,898,388 A | * | 4/1999 | Hofmann et al. | 384/446 |
| 5,986,448 A | * | 11/1999 | Yada et al. | 324/173 |
| 6,002,248 A | * | 12/1999 | Binder | 324/160 |
| 6,501,382 B1 | * | 12/2002 | Rehfus et al. | 384/459 |
| 6,559,633 B1 | * | 5/2003 | Nachtigal et al. | 324/174 |
| 6,918,596 B2 | * | 7/2005 | Ichiman | 384/448 |
| 7,690,246 B1 | * | 4/2010 | Discenzo | 73/53.05 |

FOREIGN PATENT DOCUMENTS

| | | | | |
|---|---|---|---|---|
| EP | 1156234 A2 | * | 11/2001 | |
| EP | 1615091 A1 | * | 1/2006 | |
| FR | 2574501 A1 | * | 6/1986 | |
| GB | 2242527 A | * | 10/1991 | |
| WO | WO 2004072747 A1 | * | 8/2004 | |
| WO | WO 2005052397 A1 | * | 6/2005 | |

* cited by examiner

*Primary Examiner* — Marcus Charles
(74) *Attorney, Agent, or Firm* — Arent Fox LLP

(57) ABSTRACT

A sealing device for an antifriction bearing includes a fixed support and a rotating support, the sealing device comprising a metal frame designed to be associated with a support of the bearing and a sealing joint, the frame including an annular seat and, secured to the seat, electronic identifying means consisting of a transponder connected on a communication antenna, wherein the antenna has an at least semi-annular or annular shape which is designed to be urged opposite the seat, the identifying means being secured to the seat via an insulating material layer which is interposed between the antenna and the seat so as to provide electromagnetic insulation for the antenna.

15 Claims, 1 Drawing Sheet

U.S. 7,963,700 B2

SEALING DEVICE FOR ANTIFRICTION BEARING COMPRISING IDENTIFYING MEANS

CROSS REFERENCE TO RELATED APPLICATION

This application is a National Stage entry of International Application No. PCT/FR06/001209, filed May 29, 2006, the entire specification claims and drawings of which are incorporated herewith by reference.

BACKGROUND

Field

The invention relates to a sealing device for an antifriction bearing comprising a fixed support and a rotating support, as well as such a bearing, in particular a ball bearing, comprising such a device for sealing the bearing space laterally.

Introduction

In the field of antifriction bearings, increasing demand for maintenance and traceability imposes the need for routine access to information relating, in particular, to the production, origin, characteristics and/or operating conditions of a bearing.

For this reason, document WO-A1-02/101675 suggests providing a transponder equipped with an antenna in a housing formed in a ring of a bearing. The transponder, which is capable of recording and transmitting information relating to the bearing, fulfils the aforementioned demands.

However, this embodiment is not entirely satisfactory in that the metal environment of the housing reduces the capability of the transponder to communicate with the detector designed to be positioned remotely. In fact, the propagation of radio waves through metal induces a considerable disruption of the communication signal, which imposes constraints for positioning the transponder and/or positioning the detector at a very short distance from the transponder, or even in contact with the latter in order to ensure the reliability of the communication. Moreover, the creation of the housing in the ring is not satisfactory from the mechanical and economic points of view.

Document WO-A1-2004/072747 describes the possibility of placing a transponder on a sealing joint of a bearing. However, as in the preceding document, the geometry of the communication antenna does not allow for reliable communication.

The invention aims, in particular, to solve the aforementioned problems, in particular by providing a sealing device for an anti-friction bearing that specifically integrates specific identifying means, in order, taking into consideration the severe metallic environment found in the bearings, to improve the reliability of the communication between the identifying means and the detector.

SUMMARY

According to a first aspect, the invention provides a sealing device for an antifriction bearing comprising a fixed support and a rotating support, the sealing device comprising a metal frame designed to be associated with a support of the bearing and a sealing joint, the frame comprising an annular seat and, solidly attached to the seat, electronic identifying means formed by a transponder connected to a communication antenna with an antenna geometry that is at least semi-annular or annular which is arranged to be positioned opposite the seat, the identifying means being solidly attached to the seat by means of a layer of insulating material interposed between the antenna and the seat in order to provide electromagnetic insulation for the antenna.

According to a second aspect, the invention provides an antifriction bearing, in particular a ball bearing, comprising a fixed support, a rotating support and rolling bodies placed between the supports to allow the relative rotation of the supports, the bearing also comprising such a sealing device, the frame being associated with one of the supports in order laterally to seal the bearing space formed between the supports.

Further objectives and advantages of the invention will become apparent from the following description made in reference to the appended drawings.

DETAILED DESCRIPTION

Figure 2:
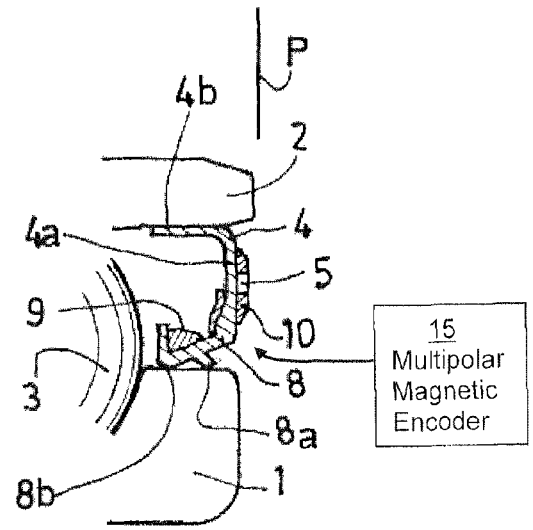
FIG. 2 is a partial longitudinal section view of a bearing equipped with a sealing device integrating the identifying means of FIG. 1, in accordance with certain aspects of the present invention.
Figure 3:
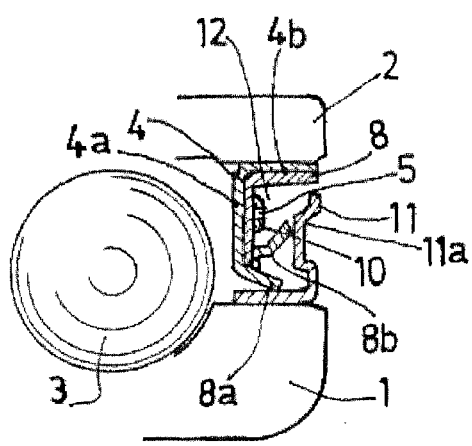
FIG. 3 is a partial longitudinal section view of a bearing equipped with a sealing device integrating the identifying means of FIG. 1, in accordance with other aspects of the present invention.
Figure 4:
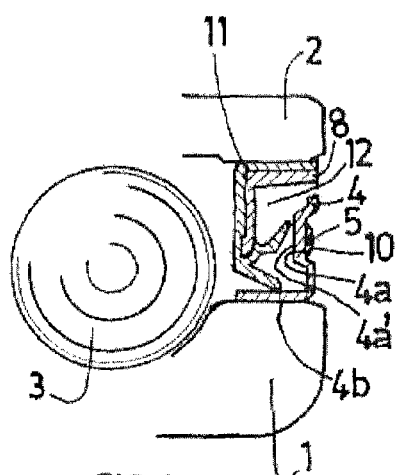
FIG. 4 is a partial longitudinal section view of a bearing equipped with a sealing device integrating the identifying means of FIG. 1, in accordance with yet other aspects of the present invention.

In relation with FIGS. 2 to 4, a ball bearing is described comprising an inner ring 1, an outer ring 2 and balls 3 placed between the rings so as to allow the relative rotation of the rings. The invention is not limited to this type of bearing, and also relates to any type of antifriction bearing comprising a fixed support and a rotating support. The rolling bodies can also have a non-spherical geometry, for example being shaped as rollers or needles.

The bearing comprises a sealing device which is positioned coaxial to the rings 1, 2 in order laterally to seal the bearing space formed between the rings. FIGS. 2 to 4 show only one side of the bearing on which the sealing device is provided, the other side possibly being equipped with a known sealing device or another sealing device according to the invention, identical or different to those shown. In particular, the sealing device can be of a known type integrating a multipolar magnetic encoder 15, for example, in order to benefit, in particular, from an angular position signal of the rotating ring in relation to the fixed ring.

The sealing device(s) allow(s) the bearing space in which the balls 3 are arranged to be insulated from the potentially polluting external environment and from possible leaks of the lubricant contained in the bearing space.

A description is given below of the three embodiments of a sealing device shown in FIGS. 2 to 4, the device comprising a metal frame 4 associated with a ring 1, 2 of the bearing and a sealing joint. Furthermore, the sealing device comprises electronic identifying means 5 formed by a transponder 6 connected to a communication antenna 7.

Figure 1:
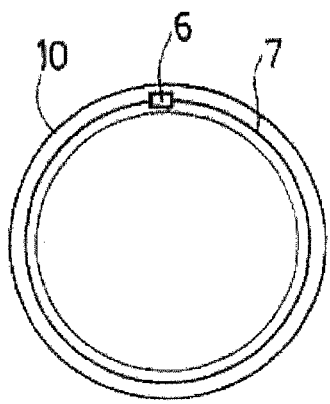
FIG. 1 is a diagrammatic front view of identifying means comprising a transponder connected to a communication antenna, the means being overmoulded from an insulating material.

FIG. 1 shows such identifying means 5 formed by an RFID (Radio Frequency Identification) tag which has the particular advantage of being capable of remotely reading and storing the information in the transponder 6, formed by an electronic chip.

In the field of antifriction bearings, the information exchanged can relate, in particular to the production of the bearing, its origin, its specific characteristic (operating temperature ranges, maximum speed of rotation, permissible loads, etc.), its state of wear and/or the operating conditions of the bearing or the assembly in which it is integrated. In particular, this information can be used for the purposes of maintenance, traceability or operation of the bearing.

According to the embodiment shown, the identifying means 5 comprise a metal annular antenna 7 connected by wires to an electronic chip 6. In a variation not shown, the geometry of the antenna 7 can be at least semi-annular, in particular semi-annular, with the chip 6, for example, connected at the central section. The antenna 7 and the chip 6 are chosen according to operating constraints, in particular in that relating to communication distances and frequencies.

In a known manner, these kinds of identifying means 5 are designed for contactless communication with a specific fixed detector (not shown) which can be external to the bearing, or even integrated with the same. The detector ensures reading/writing of the information, the information then being available for use in a system specific to the assembly integrating the bearing or in a system external to the assembly. The identifying means are preferably of the passive type, which is to say that they do not have their own energy source, although active identifying means can also be used.

The frame 4 of the sealing device is typically made from folded sheet metal and comprises a seat 4a on which the identifying means 5 are solidly attached. In particular, the geometry of the antenna 7 is arranged to be placed opposite the seat 4a, either of the whole seat in the case of an annular antenna 7 or of a circumferential portion thereof in the case of an at least semi-annular antenna 7.

This embodiment provides mechanical support for the identifying means 5, which is advantageous considering its fragility, in particular due to the size of its antenna 7 in relation to its diameter. Indeed, the antenna 7 is typically formed by a thin ring of electrically conductive material. In particular, the diameter of the antenna 7 is equal to the median diameter of the seat 4a, although it can vary within certain limits if the width of the seat 4a is greater than that of the antenna 7.

In addition, the invention allows the antenna 7 to be electromagnetically insulated from the metal frame 4 in order to reduce losses of reliability of the communication signal in the event of direct contact between the former and a metal part. For this purpose, a layer of electromagnetically insulating material is interposed between the antenna 7 and the seat 4a.

Moreover, the frame 4 forms a metal mass of less consideration than the ring 1, 2 of the bearing, so that the position of the antenna 7 at a distance from the rings interferes less with the communication signal. Furthermore, the embodiment according to the invention makes it possible to avoid specific machining of the bearing as well as modifying the general structure of the bearing to integrate the identifying means 5.

Finally, the invention makes it possible to combine the following in the frame 4 of the sealing device:
  the use of a specific antenna 7 which, in particular due to its size, allows long-distance communication (typically between 5 and 10 cm) while being mechanically supported by the frame 4 in order to prevent possible deterioration of the antenna; with
  electromagnetic insulation by interposing an insulating material between the frame 4 and the antenna 7.

According to the first embodiment (FIG. 2), the frame 4 comprises a substantially radial seat 4a connected to an axial seat 4b extending towards the inside of the bearing for fitting the frame 4 onto an inner wall of the outer ring 2.

The sealing joint comprises an elastomer element 8 overmoulded on the free end of the radial seat 4a. The elastomer element 8, for example made from Viton®, acrylonitrile or a similar material, comprises a free part in frictional contact with one wall of the inner ring 1. On particular, stress means formed by an annular spring 9 are associated with the free part so as to apply an outer lip 8a and an inner lip 8b of the part to the wall of the inner ring 2.

In this embodiment, the elastomer element 8 is associated with the frame 4 at a distance from the radial seat 4a, so as to leave the outer surface of the latter free. The identifying means 5 are associated with the free part by means of insulating material, for example by means of a polymer material.

In the embodiment of the invention shown, the identifying means 5 are overmoulded on the seat by an insulating material 10 which can be the same as or different from that forming the elastomer element 8. Overmoulding 10 has the advantage of providing mechanical protection for the identifying means 5, in particular against possible damaging contact that it might suffer during the operation of the bearing and/or during the communication. As a variation, it is possible to glue the identifying means 5 with a layer of adhesive insulating material, or to glue previously overmoulded identifying means 5.

In the embodiment of FIG. 2, the identifying means 5 are substantially arranged in the plane P of the lateral surfaces of each of the rings 1, 2. In this way, the identifying means 5 are positioned as close as possible to the outside of the bearing, which improves their accessibility for the purpose of communication from outside the bearing, while providing mechanical protection thereof due to their position inside the space formed between the rings 1, 2.

According to the second embodiment (FIG. 3), the frame 4 comprises an outer axial seat 4b for insertion and a radial seat 4a arranged inside the bearing space, at a distance from the lateral surface of the rings 1, 2.

The sealing joint comprises an elastomer element 8 which is overmoulded on the frame 4 such as to cover the outer surfaces of the frame 4 and to have a seal-free part. In particular, the free part comprises two lips, inner 8a and outer 8b respectively, which are in frictional contact with the inner surfaces of a second frame 11 which is fitted onto the inner ring 1.

In this embodiment, the identifying means 5 are associated with the elastomer element 8, the layer of the latter placed on the radial seat 4a forming a layer of insulating material for the antenna 7. In FIG. 3, the identifying means 5 are also overmoulded and glued to the elastomer element 8, which increases the electromagnetic insulation in the case of the overmoulding 10 having insulating properties.

As a variation, the identifying means 5 can be directly associated with the elastomer element 8, for example by gluing. The means can also be overmoulded from the elastomer element 8 at the same time as the frame 4. Due to the elastic properties of the element 8, the latter embodiment improves the mechanical protection of the identifying means 5, in addition to the electromagnetic insulation it provides.

According to the third embodiment (FIG. 4), the sealing device has the same structure as that in FIG. 3, namely two frames 4, 11 respectively fitted onto the rings 1, 2 so as to form an annular chamber 12 between them, where the sealing is provided.

The elastomer element 8 is associated with the inner frame 11 to be in frictional contact with the outer frame 4 inside the chamber. However, in this third embodiment, the identifying means 5 are associated with the outer frame 4.

The outer frame 4 comprises an axial seat 4b for insertion on an inner wall of the inner ring 1 and a substantially radial outer wall forming the seat 4a with which the identifying means 5 are associated by overmoulding an insulating material 10 according to the first embodiment.

The outer wall 4a comprises an inner axial indentation 4a' in which the identifying means 5 are arranged in order to be mechanically protected by the annular projections formed around the indentation 4a'. In fact, this embodiment limits all direct contact with the identifying means 5.

In the embodiments described above, the ring which is solidly attached to the identifying means 5 can be rotating or fixed, the geometry of the antenna 7 guaranteeing good communication in both scenarios, while providing optimum mechanical protection of the identifying means against aggressions suffered during the operation of the bearing.

Moreover, the identifying means 5 are positioned outside the sealing device, which is to say that they are not in direct contact with the inside of the bearing space, which also improves their protection.

Also for the purpose of protection, the embodiment of FIG. 3 can be modified by associating a sealing lip with the outer frame 11, the lip being in frictional contact with the inner frame 4 such as to seal the annular chamber 12 and therefore the identifying means against the outside of the bearing.

The invention claimed is:

1. An antifriction bearing comprising a fixed support defining a rotation axis, a rotating support rotating about the rotation axis and a sealing device comprising a first metal frame associated with one of the fixed and rotating supports and a sealing joint, the frame comprising an annular seat and an electronic identifying means formed by a transponder connected to a communication antenna,
    wherein the antenna is at least semi-annular or annular about the rotation axis and faces the seat, the identifying means being solidly attached to the seat by means of a layer of insulating material interposed between the antenna and the seat and providing electromagnetic insulation for the antenna.

2. The bearing of claim 1, wherein the identifying means comprises an RFID tag.

3. The bearing of claim 1, wherein the sealing joint comprises an elastomer element associated with the first frame.

4. The bearing of claim 3, wherein the elastomer element is associated with the first frame at a distance from the seat, the identifying means being glued or overmolded on the seat with the insulating material.

5. The bearing of claim 3, wherein the elastomer element is associated with the seat, the layer of insulating material being formed by a layer of the elastomer element.

6. The bearing of claim 5, wherein the identifying means is overmolded by the elastomer element.

7. The bearing of claim 5, wherein the identifying means is associated with the elastomer element.

8. The bearing of claim 3, wherein the sealing joint also comprises a second frame associated with the other one of the fixed and rotating supports of the bearing, an annular chamber being formed between the first and second frames, the elastomer element being in frictional contact with the second frame.

9. The bearing of claim 1 further comprising a second frame associated with the other one of the fixed and rotating supports of the bearing, an annular chamber being formed between the first and second frames, the sealing joint comprising an elastomer element associated with the second frame so as to be in frictional contact with the first frame, the identifying means being glued or overmolded on the seat with the insulating material.

10. The bearing of claim 1, further comprising a multipolar magnetic encoder solidly attached to the frame.

11. The bearing of claim 1, further comprising rolling bodies placed in a bearing space formed between the fixed and rotating supports to allow the relative rotation of the supports, wherein the sealing device laterally seals the bearing space.

12. The bearing of claim 1, wherein the transponder is arranged to record and transmit information relative to the production origin, specific characteristics, state of wear and/or operating conditions of the bearing.

13. The bearing of claim 1, wherein the seat extends radially, at least one of the fixed and rotating supports has a planar lateral surface, and the identifying means is flush with the planar lateral surface.

14. The bearing of claim 1, further comprising a second sealing device integrating a multipolar magnetic encoder.

15. The bearing claim 12, wherein the seat extends radially, the identifying means being arranged substantially in the plane of the lateral surface of at least one of the fixed and rotating supports.

\* \* \* \* \*